(12) United States Patent
Farag (10) Patent No.: US 10,132,061 B1
(45) Date of Patent: Nov. 20, 2018

(54) WATER SUPPLY REGULATING SYSTEM AND ASSOCIATED USE THEREOF

(71) Applicant: Farid Farag, Corona, CA (US)

(72) Inventor: Farid Farag, Corona, CA (US)

( * ) Notice: Subject to any disclaimer, the term of this patent is extended or adjusted under 35 U.S.C. 154(b) by 35 days.

(21) Appl. No.: 15/491,197

(22) Filed: Apr. 19, 2017

Related U.S. Application Data (60) Provisional application No. 62/297,320, filed on Feb. 19, 2016.

(51) Int. Cl.
*E03B 7/07* (2006.01)
(52) U.S. Cl.
CPC .............. *E03B 7/071* (2013.01); *E03B 7/075* (2013.01)
(58) Field of Classification Search
CPC .................................. E03B 7/071; E03B 7/075
See application file for complete search history.

(56) References Cited

U.S. PATENT DOCUMENTS

| | | | | |
|---|---|---|---|---|
| 6,526,807 B1 * | 3/2003 | Doumit | ................... | G01M 3/04 340/605 |
| 6,970,808 B2 * | 11/2005 | Abhulimen | ............... | F17D 5/08 702/185 |
| 8,720,481 B2 * | 5/2014 | Guy | ......................... | E03B 7/071 137/486 |
| 8,776,824 B2 * | 7/2014 | Yao | .......................... | E03B 7/071 137/312 |
| 8,850,871 B2 * | 10/2014 | Schaefer | .............. | G01M 3/2807 73/40.5 A |
| 9,019,120 B2 * | 4/2015 | Broniak | ............... | G01M 3/2807 340/870.02 |
| 9,297,150 B2 * | 3/2016 | Klicpera | .................. | E03B 7/071 |
| 9,458,608 B1 * | 10/2016 | Chevalier | ............... | E03B 7/071 |
| 2014/0196802 A1 * | 7/2014 | Guy | ......................... | E03B 7/071 137/486 |

\* cited by examiner

*Primary Examiner* — Eric Keasel
(74) *Attorney, Agent, or Firm* — Ashkan Najafi (57) ABSTRACT

A water supply regulating system includes a housing having a water line input conduit and a water line output conduit located downstream therefrom, and in fluid communication with an existing water supply source providing incoming water ingressing the housing. Advantageously, a first mechanism is configured to detect a water leak in the existing plumbing system located downstream of the water line output conduit. Notably, a second mechanism configured to automatically shut off outgoing water egressing the housing via the water line output conduit. A first controller is in operable communication with the first mechanism and the second mechanism. An external host server is located external of the housing and in operable communication with the first controller. Advantageously, a second controller is located external of the housing and in operable communication with the first controller and the external host server.

19 Claims, 7 Drawing Sheets

WATER SUPPLY REGULATING SYSTEM AND ASSOCIATED USE THEREOF

CROSS REFERENCE TO RELATED APPLICATIONS

This is a non-provisional patent application that claims the benefit of U.S. provisional patent application No. 62/297,320 filed Feb. 19, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to water monitoring systems and, more particularly, to a water supply regulating system is intended for installation on an incoming water-supply line for monitoring and controlling water-pressure, and notifying—through a user's smartphone or computer—any loss of pressure that indicates a leak or failure within the plumbing system. In such an event, the system would automatically shut down the water-supply, thus limiting damages that may occur, as well as the wasting of water.

Prior Art

Property damage due to plumbing leaks—specifically from failed water heaters and other water-supply tanks such as those employed in water-softening systems—continue to be the most common, and most costly, property insurance claims. Precise national data on the number and cost of such claims is difficult to come by, since the only truly nationwide database—that of the Insurance Industry Institute—is protected as proprietary information available only to the member insurance companies. However, according to the trade organization Insurance Institute Network of California, claims arising from plumbing failures rank second, only behind hurricanes, in terms of both the number of homes damaged and the amount of claim costs in the US. The average cost of a water claim in California nearly doubled over a five-year time span; and in a study by the California Insurance Department, 32 percent of carriers refused to renew policies for people who made one or two water-loss claims within a three-year period.

The biggest problems with water-damage due to plumbing leaks and failures are, first, that minor leaks usually go undetected by the homeowner (or business-owner), and cause damage over a long period of time, becoming noticeable only when the eventual evidence of the leak—mold and rot and mildew—present themselves. And second, it seems to be a law of nature or human life that large-scale plumbing disasters—like those arising from ruptured water-heaters—occur only when no one is there to shut off the water-supply and contain the damage.

Accordingly, a need remains for water supply regulating system in order to overcome at least one aforementioned shortcoming. The exemplary embodiment(s) satisfy such a need by providing a water supply regulating system intended for installation on an incoming water-supply line that is convenient and easy to use, lightweight yet durable in design, versatile in its applications, and designed for monitoring and controlling water-pressure, and notifying—through a user's smartphone or computer—any loss of pressure that indicates a leak or failure within the plumbing system. In such an event, the system would automatically shut down the water-supply, thus limiting damages that may occur, as well as the wasting of water.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a water supply regulating system for monitoring and controlling water-pressure at an existing plumbing system. These and other objects, features, and advantages of the non-limiting exemplary embodiment(s) are provided by a water supply regulating system including a housing having a water line input conduit and a water line output conduit located downstream therefrom. Such a water line input is in fluid communication with an existing water supply source providing incoming water ingressing the housing. The water line output conduit is in fluid communication with the water line input conduit. Advantageously, a first mechanism is configured to detect a water leak in the existing plumbing system located downstream of the water line output conduit. Notably, a second mechanism configured to automatically shut off outgoing water egressing the housing via the water line output conduit. A first controller is in operable communication with the first mechanism and the second mechanism.

The system further includes an external host server located external of the housing and in operable communication with the first controller. Advantageously, a second controller is located external of the housing and in operable communication with the first controller and the external host server. In this manner, when the first mechanism detects a triggering event, each of the first controller and the second controller operably communicate with the external host server and thereby independently and automatically toggle the second mechanism to a closed position from an open position. Convesely, when the first mechanism detects no triggering event, each of the first controller and the second controller operably communicate with the external host server and thereby independently and automatically toggle the second mechanism to the open position from the closed position.

In a non-limiting exemplary embodiment, upon detecting the triggering event, the first mechanism generates and transmits a true alert signal to the first controller and the second controller. Conversely, upon not detecting the triggering event, the first mechanism generates and transmits a false alert signal to the first controller and the second controller. Advantageously, the second mechanism is toggled between the open position and the closed position, respectively, when the false alert signal and the true alert signal are received at the first controller and the second controller.

In a non-limiting exemplary embodiment, the first controller includes a processor, and a memory in communication with the processor. Advantageously, such a memory includes software instructions, when executed by the processor, which are configured to: detect and notify the user of any loss of water pressure that indicates a water leak within the existing plumbing system; and when the water leak is detected, automatically shutting down the outgoing water to the existing plumbing system.

In a non-limiting exemplary embodiment, the first mechanism includes at least one sensor in communication with the water line output conduit.

In a non-limiting exemplary embodiment, the second mechanism includes a servo motor, and a flap valve operably coupled to the servo motor.

In a non-limiting exemplary embodiment, the flap valve includes an annular medial portion, a linear top rod directly attached to the annular medial portion and the servo motor, and a linear bottom rod directly attached to the annular medial portion and each of the water line input conduit and the water line output conduit.

In a non-limiting exemplary embodiment, the servo motor is operably coupled to the first controller and the second controller. Notably, the flap valve is configured to articulate in clockwise and counter clockwise rotational directions, respectively, in response to the first controller and the second controller receiving the true alert signal and the false alert signal, respectively.

In a non-limiting exemplary embodiment, the water line input conduit includes a distal end seated inside the housing and aligned subjacent to the servo motor such that the flap valve is partially disposed within the water line input conduit. Advantageously, the water line output conduit includes a distal end seated inside the housing and aligned subjacent to the servo motor such that the flap valve is partially disposed within the water line input conduit.

In a non-limiting exemplary embodiment, the distal end of the water line input conduit is directly abutted against the distal end of the water line output conduit and thereby defines a water-tight channel traversing through an entire width of the housing.

The present disclosure further includes a method of utilizing a water supply regulating system for monitoring and controlling water-pressure at an existing plumbing system. Such a method includes the initial step of: providing a housing including a water line input conduit and a water line output conduit located downstream therefrom, wherein the water line input is in fluid communication with an existing water supply source providing incoming water ingressing the housing. The water line output conduit is in fluid communication with the water line input conduit, and a first mechanism is configured to detect a water leak in the existing plumbing system located downstream of the water line output conduit. A second mechanism is configured to automatically shut off outgoing water egressing the housing via the water line output conduit, and a first controller is in operable communication with the first mechanism and the second mechanism.

The method further includes the steps of: providing and locating an external host server external of the housing; operably communicating the external host server with the first controller; providing and locating a second controller external of the housing; operably communicating the second controller with the first controller and the external host server; when the first mechanism detects a triggering event, each of the first controller and the second controller operably communicating with the external host server and thereby independently and automatically toggling the second mechanism to a closed position from an open position; and when the first mechanism detects no triggering event, each of the first controller and the second controller operably communicating with the external host server and thereby independently and automatically toggling the second mechanism to the open position from the closed position.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-8 and is/are intended to provide a water supply regulating system 10 for installation on an incoming water-supply line for monitoring and controlling water-pressure, and notifying—through a user's smartphone or computer—any loss of pressure that indicates a leak or failure within the plumbing system 10. In such an event, the system 10 would automatically shut down the water-supply, thus limiting damages that may occur, as well as the wasting of water. It should be understood that the exemplary embodiment(s) may be used to regulate a variety of water supply sources, and should not be limited to any particular water supply source described herein.

Referring to FIGS. 1-8, the water supply regulating system 10 includes a housing 11 having a water line input conduit 12 and a water line output conduit 13 located downstream therefrom. Such a water line input conduit 12 is in fluid communication with an existing water supply source (not shown) providing incoming water ingressing the housing 11. The water line output conduit 13 is in fluid communication with the water line input conduit 12. Advantageously, a first mechanism 14 is configured to detect a water leak in the existing plumbing system 10 located downstream of the water line output conduit 13. Notably, a second mechanism 15 is configured to automatically shut off outgoing water egressing the housing 11 via the water line output conduit 13. A first controller 16 is in operable communication with the first mechanism 14 and the second mechanism 15.

Figure 1:
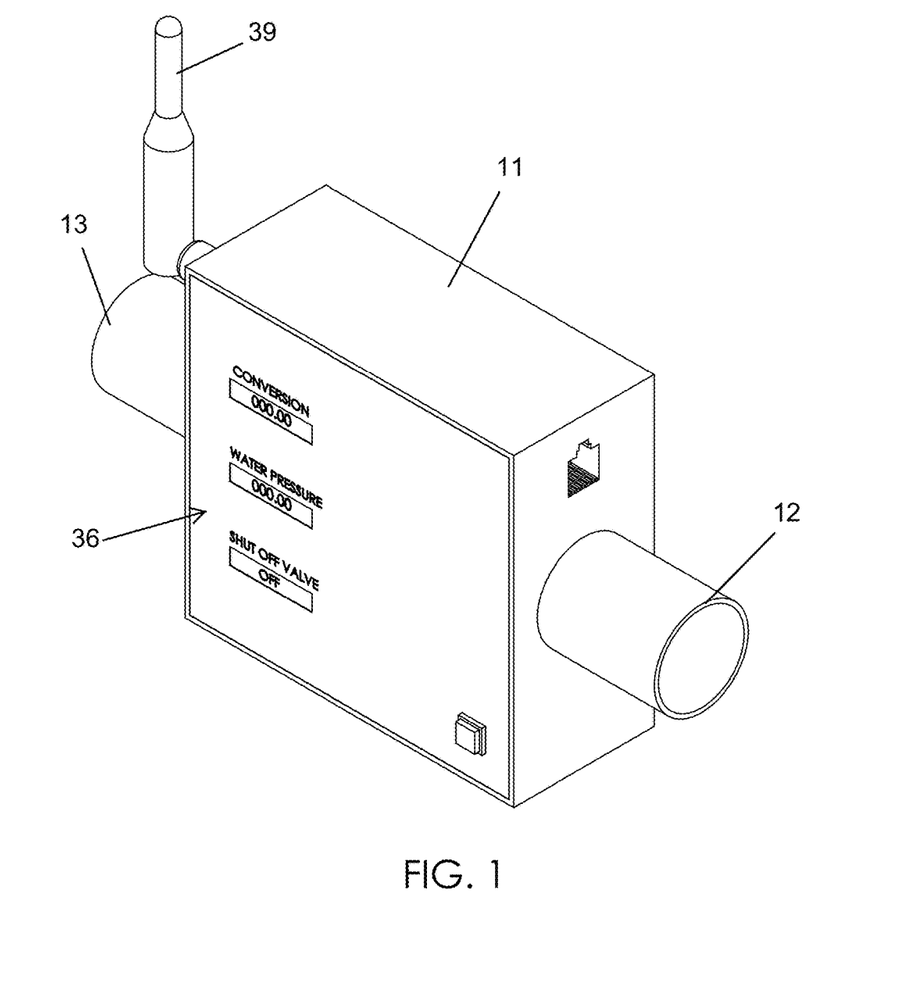
FIG. 1 is perspective view of a housing that is part of a water supply regulating system, in accordance with a non-limiting exemplary embodiment.
Figure 2:
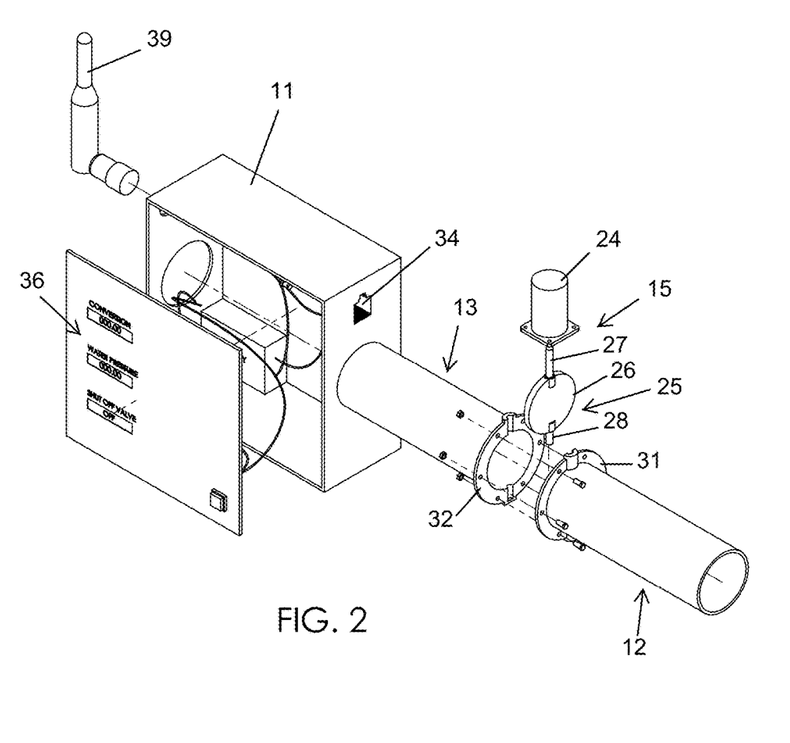
FIG. 2 is an exploded view of the housing shown in FIG. 1.
Figure 3:
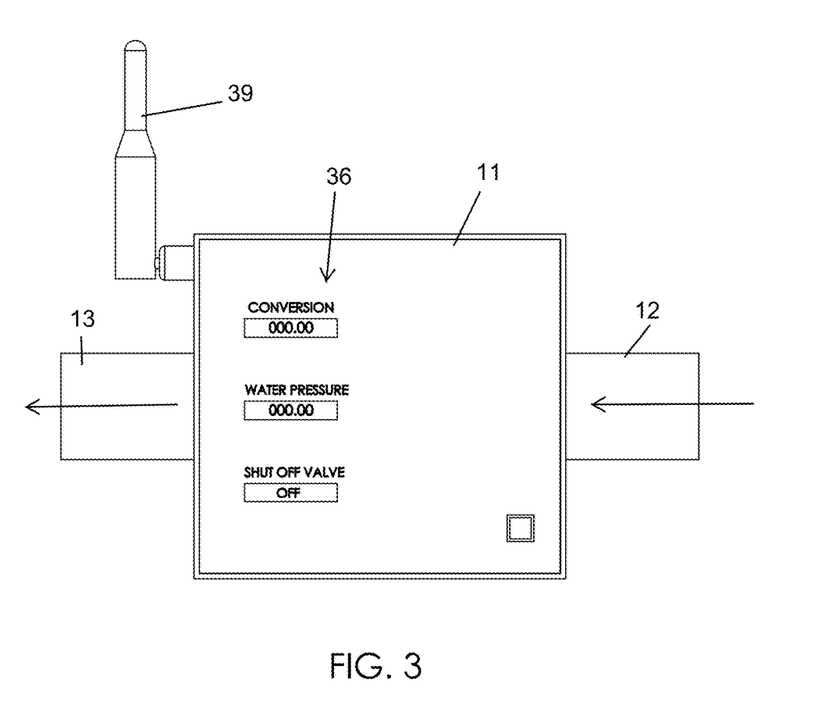
FIG. 3 is a side elevational view of the housing showing in FIG. 1.
Figure 4:
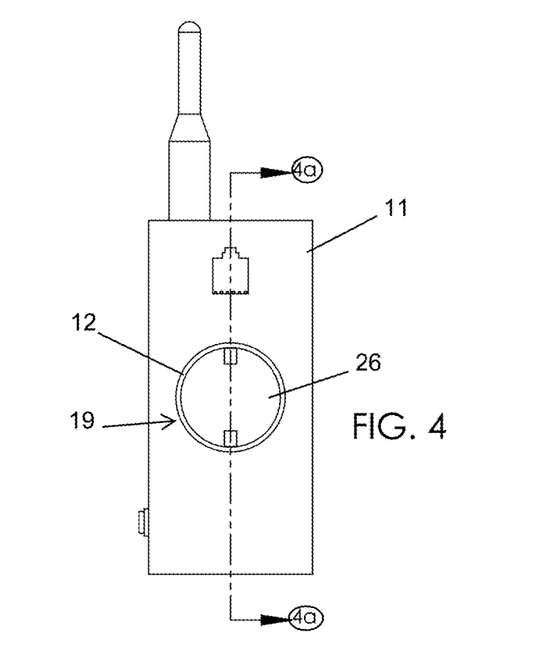
FIG. 4 is a front elevational view of the housing showing in FIG. 1, wherein said second mechanism (flap valve) is toggled to a closed position.
Figure 4A:
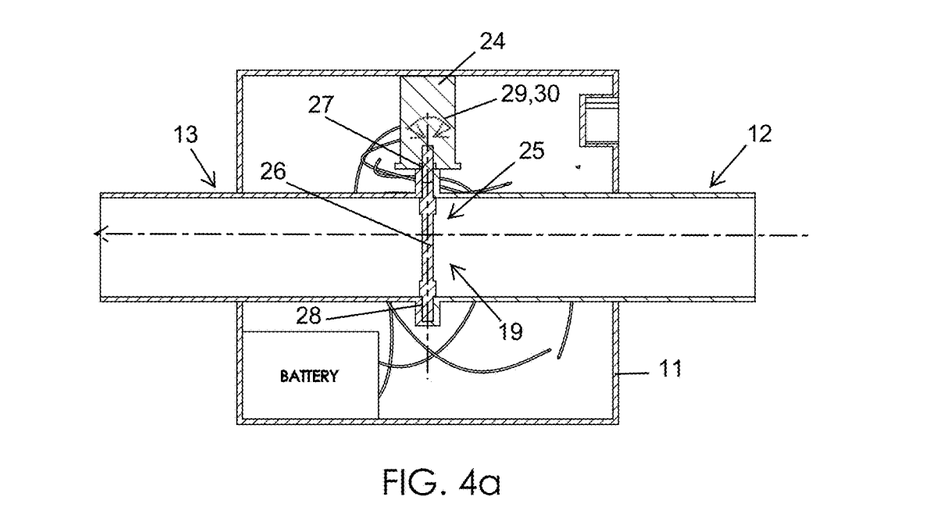
FIG. 4a is a cross-sectional view taken along line 4a-4a in FIG. 4.
Figure 5:
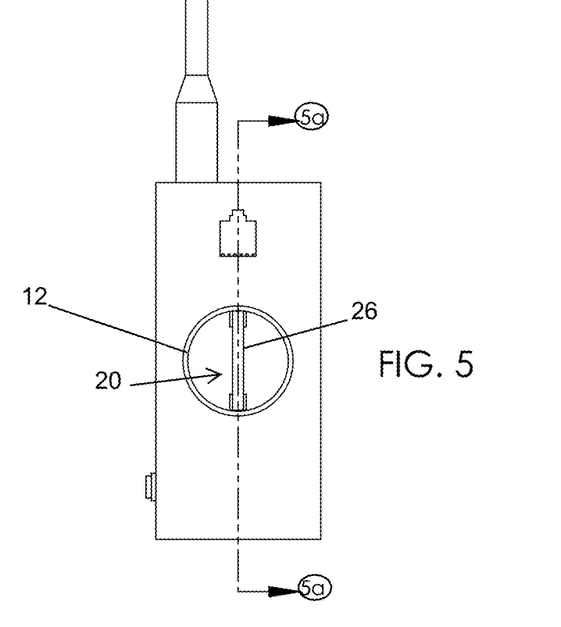
FIG. 5 is a front elevational view of the housing showing in FIG. 1, wherein said second mechanism (flap valve) is toggled to an open position.
Figure 5A:
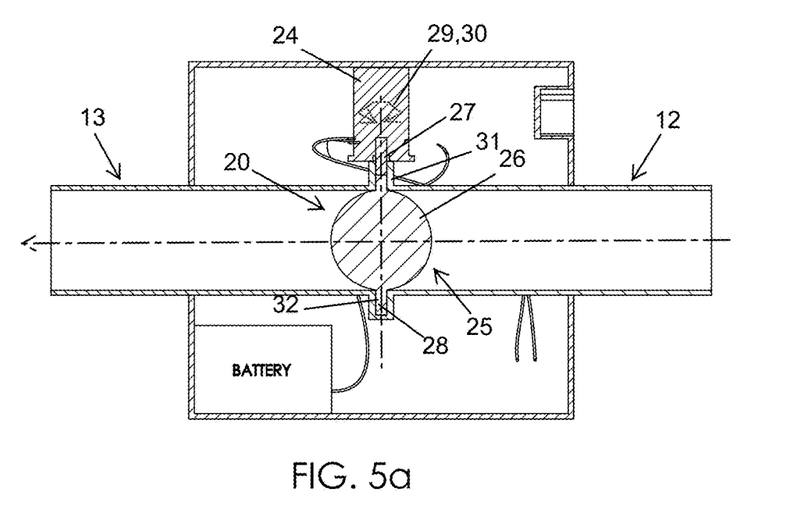
FIG. 5a is a cross-sectional view taken along line 5a-5a in FIG. 5.
Figure 6:
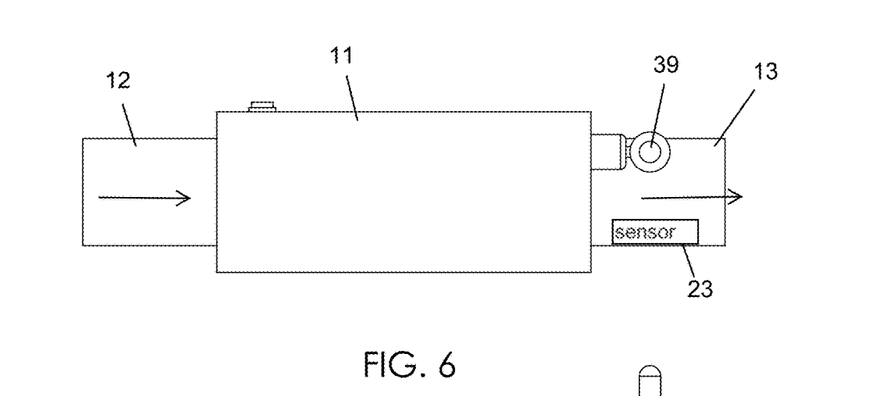
FIG. 6 is a top plan view of the housing showing in FIG. 1.
Figure 7:
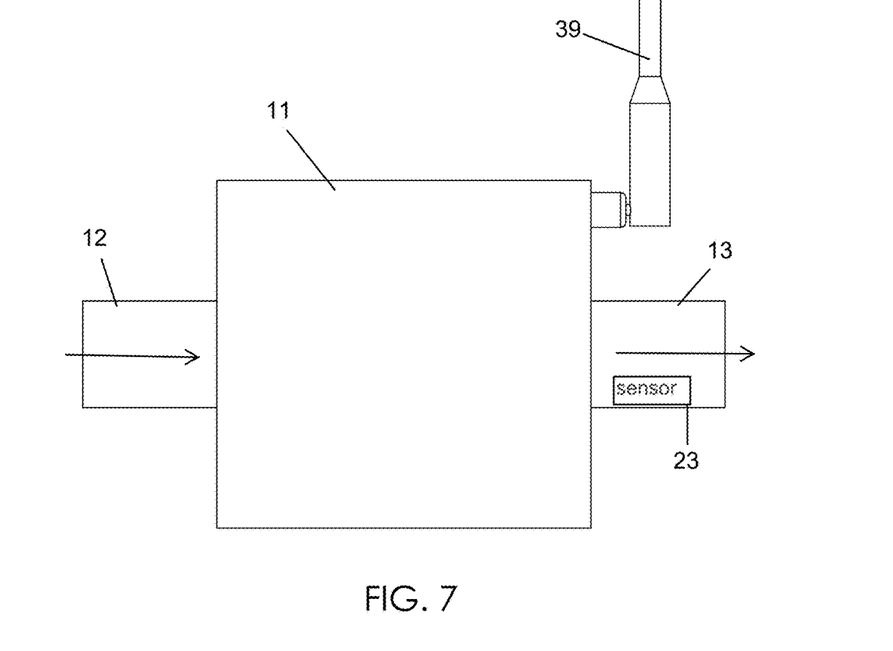
FIG. 7 is a rear elevational view of the housing showing in FIG. 1.
Figure 8:
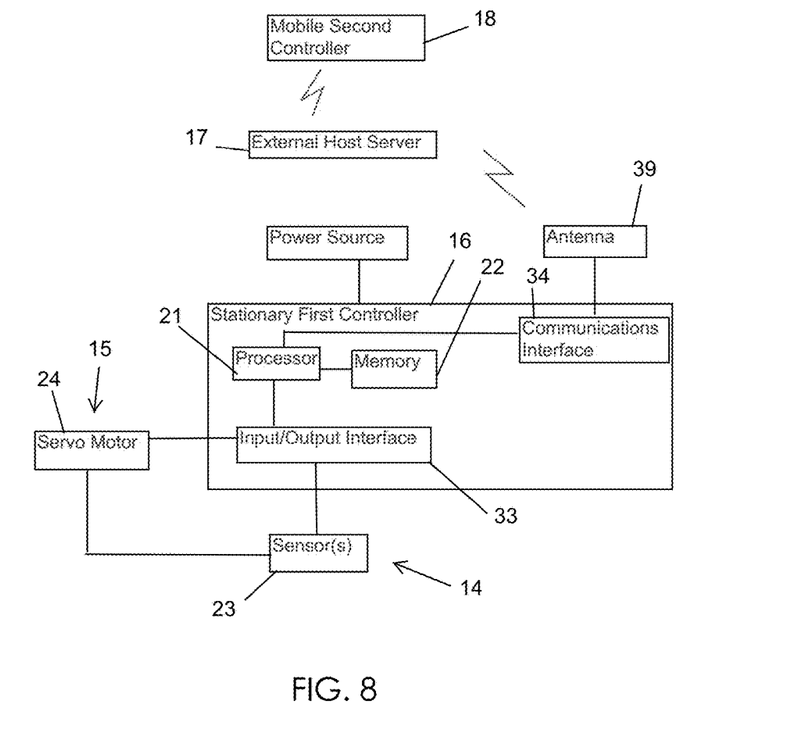
FIG. 8 is a high-level schematic block diagram illustrating the interrelationship between the major electronic components of the water supply regulating system, in accordance with a non-limiting exemplary embodiment.

The system 10 further includes an external host server 17 located external of the housing 11 and in operable communication with the first controller 16. Advantageously, a second controller 18 is located external of the housing 11 and in operable communication with the first controller 16 and the external host server 17. In this manner, when the first mechanism 14 detects a triggering event (e.g., significant drop in water pressure in the water line output conduit 13), each of the first controller 16 and the second controller 18 operably communicate with the external host server 17 and thereby independently and automatically toggle the second mechanism 15 to a closed position 19 from an open position 20. Conversely, when the first mechanism 14 detects no triggering event (e.g. no significant drop in water pressure in the water line output conduit 13), each of the first controller 16 and the second controller 18 operably communicate with the external host server 17 and thereby independently and automatically toggle the second mechanism 15 to the open position 20 from the closed position 19.

In a non-limiting exemplary embodiment, upon detecting the triggering event, the first mechanism 14 generates and transmits a true alert signal to the first controller 16 and the second controller 18. Conversely, upon not detecting the triggering event, the first mechanism 14 generates and transmits a false alert signal to the first controller 16 and the second controller 18. Advantageously, the second mechanism 15 is toggled between the open position 20 and the closed position 19, respectively, when the false alert signal and the true alert signal are received at the first controller 16 and the second controller 18.

In a non-limiting exemplary embodiment, the first controller 16 includes a processor 21, and a memory 22 in communication with the processor 21. Advantageously, such a memory 22 includes software instructions, when executed by the processor 21, configured to: detect and notify the user of any loss of water pressure that indicates a water leak within the existing plumbing system 10; and when the water leak is detected, automatically shutting down the outgoing water to the existing plumbing system 10.

The processor 21 may include a microprocessor or other devices capable of being programmed or configured to perform computations and instruction processing in accordance with the disclosure. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor.

Functions and process steps described herein may be performed using programmed computer devices and related hardware, peripherals, equipment and networks. When programmed, the computing devices are configured to perform functions and carry out steps in accordance with principles of the disclosure. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

The memory 22 includes programmable software instructions that are executed by the processor. In particular, the programmable software instructions include a plurality of chronological operating steps that define a control logic algorithm for performing the intended functions of the present disclosure. Such software instructions may be written in a variety of computer program languages such as C++, Fortran and Pascal, for example. One skilled in the art understands that such software instructions may contain various Boolean logic processes that perform the intended function of the present disclosure. Therefore, the specific source or object code of the software program is not intended to be a limiting factor in executing the present disclosure's intended function.

The memory 22, which enables storage of data and programs, may include RAM, ROM, flash memory and any other form of readable and writable storage medium known in the art or hereafter developed. The memory 22 may be a separate component or an integral part of another component such as processor 21.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement methods described herein.

In a non-limiting exemplary embodiment, the first mechanism 14 includes at least one sensor 23 in communication with the water line output conduit 13. One or more sensor(s) 23, such as a motion and/or light sensor(s) may be provided to cause the present disclosure for detecting an event, for example. Active and/or passive sensors may be used to react to detectable subject matter such as light, noise, radiation (e.g., heat), or changes in emitted energy, fields or beams. However, the disclosure is not limited to a particular type of sensor. Those skilled in the art will appreciate that other sensors may be used without departing from the scope of the disclosure. Examples of such other sensors include pressure sensitive mats; optical sensors configured to sense light; microwave sensors that use a Gunn diode operating within pre-set limits to transmit/flood a designated area/zone with an electronic field whereby movement in the zone disturbs the field and sets off an alarm; an ultrasonic sensor configured to react to a determined range of ultrasonic sound energy in a protected area; or any other sensor capable of providing motion detection capability in accordance with principles of the disclosure.

In a non-limiting exemplary embodiment, the second mechanism 15 includes a servo motor 24, and a flap valve 25 operably coupled to the servo motor 24.

In a non-limiting exemplary embodiment, the flap valve 25 includes an annular medial portion 26, a linear top rod 27 directly attached to the annular medial portion 26 and the servo motor 24, and a linear bottom rod 28 directly attached to the annular medial portion 26 and each of the water line input conduit 12 and the water line output conduit 13.

In a non-limiting exemplary embodiment, the servo motor 24 is operably coupled to the first controller 16 and the second controller 18. Notably, the flap valve 25 is configured to articulate in clockwise and counter clockwise rotational directions 29, 30, respectively, in response to the first controller 16 and the second controller 18 receiving the true alert signal and the false alert signal, respectively.

In a non-limiting exemplary embodiment, the water line input conduit 12 includes a distal end 31 seated inside the housing 11 and aligned subjacent to the servo motor 24 such that the flap valve 25 is partially disposed within the water line input conduit 12. Advantageously, the water line output conduit 13 includes a distal end 32 seated inside the housing 11 and aligned subjacent to the servo motor 24 such that the flap valve 25 is partially disposed within the water line input conduit 12.

In a non-limiting exemplary embodiment, the distal end 31 of the water line input conduit 12 is directly abutted against the distal end 32 of the water line output conduit 13 and thereby defines a water-tight channel traversing through an entire width of the housing 11.

In a non-limiting exemplary embodiment, an input/output interface 33 (e.g., serial bus, etc.) is operably coupled to the processor 21, first mechanism 14 and second mechanism 15.

In a non-limiting exemplary embodiment, a communications device 34 is operably coupled to the processor 21 and linked to an external antenna 39. By way of example and not limitation, the communications device 39 may communicate with the host server 17 and second controller 18 using one or more wireless LAN (WLAN) protocols, using low power, ultra wide band (UWB) communication signals or some other type of wireless signals for RF or optical (e.g., infrared) communication of information to 39. A real-time WLAN protocol or a standard wireless LAN protocol such as that of IEEE 802.11.times., Bluetooth or IrDA may be used without departing from the scope of the present disclosure. A local network that connects the communications device 39 to their respective local computer systems may, for example, consist of a single, unified full duplex LAN, such as a 100BaseT Ethernet LAN. Alternatively, the local network may include two or more interconnected LANs or other network communications means. Any of a variety of other types of computer systems and associated applications may be provided on the network.

In a non-limiting exemplary embodiment, a display panel 36 provides real-time information about various operating parameters of system 10. The display screen 36 is configured for displaying various amounts of textual and/or graphical information. The display may be monochrome or color, of various physical dimensions, of various types. In one embodiment, the display may be suitable for displaying full motion video in color. By way of example and not limitation, the display may be comprised of a liquid crystal display (LCD); a field emission display FED; so called "E-ink" technologies, which employ microspheres having at least two reflectance states; a cathode-ray tube (CRT) display; a gas plasma display; an LED readout configured to display alpha-numeric and graphical information; or any other compatible visual display device. In a preferred implementation, the display is large enough to display, with clarity, one or more lines of information. Optionally, the display screen 36 may be configured with a touch-screen interface, to present a user with a graphical user interface.

The present disclosure further includes a method of utilizing a water supply regulating system 10 for monitoring and controlling water-pressure at an existing plumbing system 10. Such a method includes the initial step of: providing a housing 11 including a water line input conduit 12 and a water line output conduit 13 located downstream therefrom, wherein the water line input conduit 12 is in fluid communication with an existing water supply source providing incoming water ingressing the housing 11. The water line output conduit 13 is in fluid communication with the water line input conduit 12, and a first mechanism 14 is configured to detect a water leak in the existing plumbing system 10 located downstream of the water line output conduit 13. A second mechanism 15 is configured to automatically shut off outgoing water egressing the housing 11 via the water line output conduit 13, and a first controller 16 is in operable communication with the first mechanism 14 and the second mechanism 15.

The method further includes the steps of: providing and locating an external host server 17 external of the housing 11; operably communicating the external host server 17 with the first controller 16; providing and locating a second controller 18 external of the housing 11; operably communicating the second controller 18 with the first controller 16 and the external host server 17; when the first mechanism 14 detects a triggering event, each of the first controller 16 and the second controller 18 operably communicating with the external host server 17 and thereby independently and automatically toggling the second mechanism 15 to a closed position 19 from an open position 20; and when the first mechanism 14 detects no triggering event, each of the first controller 16 and the second controller 18 operably communicating with the external host server 17 and thereby independently and automatically toggling the second mechanism 15 to the open position 20 from the closed position 19.

Referring to FIGS. 1-8 in general, in a non-limiting exemplary embodiment(s), the water supply regulating system 10 is a compact electronic device which, installed at the junction of a water-main and the water supply-line to a home or business, provides continuous monitoring and control of the water-pressure, alerting the property owner to any drop in pressure that indicates a plumbing leak, and shutting off the main water valve in the event of such a pressure drop. (Such a pressure drop might be due to a leaking or failed pipe or appliance, or to an unauthorized individual stealing water—as, for example, by "tapping into" the line by a garden hose and outdoor spigot.)

The water supply regulating system 10 transmits its alerts to the property owner via his or her smartphone or personal computer, and the software program or application would also permit the owner to shut down the water supply remotely when such an alert is received.

The water supply regulating system 10 is triangular or rectangular in configuration, depending upon the specific layout of the water-main/supply-line junction. In general, the device measures 4 to 6 inches in height, 6 to 8 inches in length, and 3 to 6 inches in depth or thickness.

The water supply regulating system 10 may be powered by standard 120-volt household alternating current, with a direct current battery backup to which the unit responds during a power failure. The device is equipped with sensors 23 to gauge the water-pressure within the main supply-line, and with a servo-motor 24 capable of closing the main valve 25 automatically in the event of a severe pressure-drop, as well as when instructed to do so remotely by the owner.

The water supply regulating system 10 can be installed in-line on the main supply pipe, with a secure inflow fitting on the upstream side, and a secure outflow fitting on the downstream side. The device itself, although operating automatically and capable of remote-control, also permits direct, hands-on operation. The face of the unit displays a continuous digital water-pressure reading, and have push-button digital controls for displaying the month, week, day, or hour's water-usage, and a push-button control for opening or closing the main water valve. Thus, beyond its function of detecting and responding to pressure drops, the water supply regulating system 10 could also be used to make sure one's water-meter was functioning accurately—and being read accurately by the water utility.

The water supply regulating system 10 provides a direct, immediate means of shutting down the water supply in the event of an appliance failure (water-heater or water-softener tanks, etc.), burst pipe, or water piracy. Further, because the system 10 acts immediately—on its own or through the command of its operator—the waste of water would be minimal, and any property damage resulting from the water would be minimized as well. Thus, the water supply regulating system 10 acts to both conserve water—saving consumers money on their water bills; and act to minimize the property damage that occurs due to undetected, long-term water leakage.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A water supply regulating system for monitoring and controlling water-pressure at an existing plumbing system, said water supply regulating system comprising:
    a housing including
        a water line input conduit and a water line output conduit located downstream therefrom, wherein said water line input conduit is in fluid communication with an existing water supply source providing incoming water ingressing said housing, wherein said water line output conduit is in fluid communication with said water line input conduit,
        a first mechanism configured to detect a water leak in the existing plumbing system located downstream of said water line output conduit,
        a second mechanism configured to automatically shut off outgoing water egressing said housing via said water line output conduit, and
        a first controller being in operable communication with said first mechanism and said second mechanism;
    an external host server being in operable communication with said first controller; and
    a second controller being in operable communication with said first controller and said external host server;
    wherein, when said first mechanism detects a triggering event, each of said first controller and said second controller operably communicate with said external host server and thereby independently and automatically toggle said second mechanism to a closed position from an open position;
    wherein, when said first mechanism detects no triggering event, each of said first controller and said second controller operably communicate with said external host server and thereby independently and automatically toggle said second mechanism to the open position from the closed position.

2. The water supply regulating system of claim 1, wherein, upon detecting said triggering event, said first mechanism generates and transmits a true alert signal to said first controller and said second controller;
    wherein, upon not detecting said triggering event, said first mechanism generates and transmits a false alert signal to said first controller and said second controller;
    wherein said second mechanism is toggled between the open position and the closed position, respectively, when said false alert signal and said true alert signal are received at said first controller and said second controller.

3. The water supply regulating system of claim 2, wherein said first controller comprises:
    a processor; and
    a memory in communication with said processor, said memory including software instructions, when executed by said processor, configured to:
        detect and notify the user of any loss of water pressure that indicates a water leak within the existing plumbing system, and
        when the water leak is detected, automatically shutting down the outgoing water to the existing plumbing system.

4. The water supply regulating system of claim 3, wherein said first mechanism comprises:
    at least one sensor in communication with said water line output conduit.

5. The water supply regulating system of claim 4, wherein said second mechanism comprises:
    a servo motor; and
    a flap valve operably coupled to said servo motor.

6. The water supply regulating system of claim 5, wherein said flap valve comprises:
    an annular medial portion;
    a linear top rod directly attached to said annular medial portion and said servo motor; and
    a linear bottom rod directly attached to said annular medial portion and each of said water line input conduit and said water line output conduit.

7. The water supply regulating system of claim 6, wherein said servo motor is operably coupled to said first controller and said second controller;
    wherein said flap valve is configured to articulate in clockwise and counter clockwise rotational directions, respectively, in response to said first controller and said second controller receiving said true alert signal and said false alert signal, respectively.

8. The water supply regulating system of claim 7, wherein said water line input conduit comprises: a distal end seated inside said housing and aligned subjacent to said servo motor such that said flap valve is partially disposed within said water line input conduit;
    wherein said water line output conduit comprises: a distal end seated inside said housing and aligned subjacent to said servo motor such that said flap valve is partially disposed within said water line input conduit.

9. The water supply regulating system of claim 8, wherein said distal end of said water line input conduit is directly abutted against said distal end of said water line output conduit and thereby defines a water-tight channel traversing through an entire width of said housing.

10. A water supply regulating system for monitoring and controlling water-pressure at an existing plumbing system, said water supply regulating system comprising:
    a housing including
        a water line input conduit and a water line output conduit located downstream therefrom, wherein said water line input conduit is in fluid communication with an existing water supply source providing incoming water ingressing said housing, wherein said water line output conduit is in fluid communication with said water line input conduit,
        a first mechanism configured to detect a water leak in the existing plumbing system located downstream of said water line output conduit,
        a second mechanism configured to automatically shut off outgoing water egressing said housing via said water line output conduit, and
        a first controller being in operable communication with said first mechanism and said second mechanism;
    an external host server located external of said housing and being in operable communication with said first controller; and
    a second controller located external of said housing and being in operable communication with said first controller and said external host server;
    wherein, when said first mechanism detects a triggering event, each of said first controller and said second controller operably communicate with said external host server and thereby independently and automatically toggle said second mechanism to a closed position from an open position;

wherein, when said first mechanism detects no triggering event, each of said first controller and said second controller operably communicate with said external host server and thereby independently and automatically toggle said second mechanism to the open position from the closed position.

11. The water supply regulating system of claim 10, wherein, upon detecting said triggering event, said first mechanism generates and transmits a true alert signal to said first controller and said second controller;
wherein, upon not detecting said triggering event, said first mechanism generates and transmits a false alert signal to said first controller and said second controller;
wherein said second mechanism is toggled between the open position and the closed position, respectively, when said false alert signal and said true alert signal are received at said first controller and said second controller.

12. The water supply regulating system of claim 11, wherein said first controller comprises:
a processor; and
a memory in communication with said processor, said memory including software instructions, when executed by said processor, configured to:
detect and notify the user of any loss of water pressure that indicates a water leak within the existing plumbing system, and
when the water leak is detected, automatically shutting down the outgoing water to the existing plumbing system.

13. The water supply regulating system of claim 12, wherein said first mechanism comprises: at least one sensor in communication with said water line output conduit.

14. The water supply regulating system of claim 13, wherein said second mechanism comprises:
a servo motor; and
a flap valve operably coupled to said servo motor.

15. The water supply regulating system of claim 14, wherein said flap valve comprises:
an annular medial portion;
a linear top rod directly attached to said annular medial portion and said servo motor; and
a linear bottom rod directly attached to said annular medial portion and each of said water line input conduit and said water line output conduit.

16. The water supply regulating system of claim 15, wherein said servo motor is operably coupled to said first controller and said second controller;
wherein said flap valve is configured to articulate in clockwise and counter clockwise rotational directions, respectively, in response to said first controller and said second controller receiving said true alert signal and said false alert signal, respectively.

17. The water supply regulating system of claim 16, wherein said water line input conduit comprises: a distal end seated inside said housing and aligned subjacent to said servo motor such that said flap valve is partially disposed within said water line input conduit;
wherein said water line output conduit comprises: a distal end seated inside said housing and aligned subjacent to said servo motor such that said flap valve is partially disposed within said water line input conduit.

18. The water supply regulating system of claim 17, wherein said distal end of said water line input conduit is directly abutted against said distal end of said water line output conduit and thereby defines a water-tight channel traversing through an entire width of said housing.

19. A method of utilizing a water supply regulating system for monitoring and controlling water-pressure at an existing plumbing system, said method comprising the steps of:
providing a housing including a water line input conduit and a water line output conduit located downstream therefrom, wherein said water line input is in fluid communication with an existing water supply source providing incoming water ingressing said housing, wherein said water line output conduit is in fluid communication with said water line input conduit, a first mechanism configured to detect a water leak in the existing plumbing system located downstream of said water line output conduit, a second mechanism configured to automatically shut off outgoing water egressing said housing via said water line output conduit, and a first controller being in operable communication with said first mechanism and said second mechanism;
providing and locating an external host server external of said housing;
operably communicating said external host server with said first controller;
providing and locating a second controller external of said housing;
operably communicating said second controller with said first controller and said external host server;
when said first mechanism detects a triggering event, each of said first controller and said second controller operably communicating with said external host server and thereby independently and automatically toggling said second mechanism to a closed position from an open position;
when said first mechanism detects no triggering event, each of said first controller and said second controller operably communicating with said external host server and thereby independently and automatically toggling said second mechanism to the open position from the closed position.

* * * * *